United States Patent Office 3,539,620
Patented Nov. 10, 1970

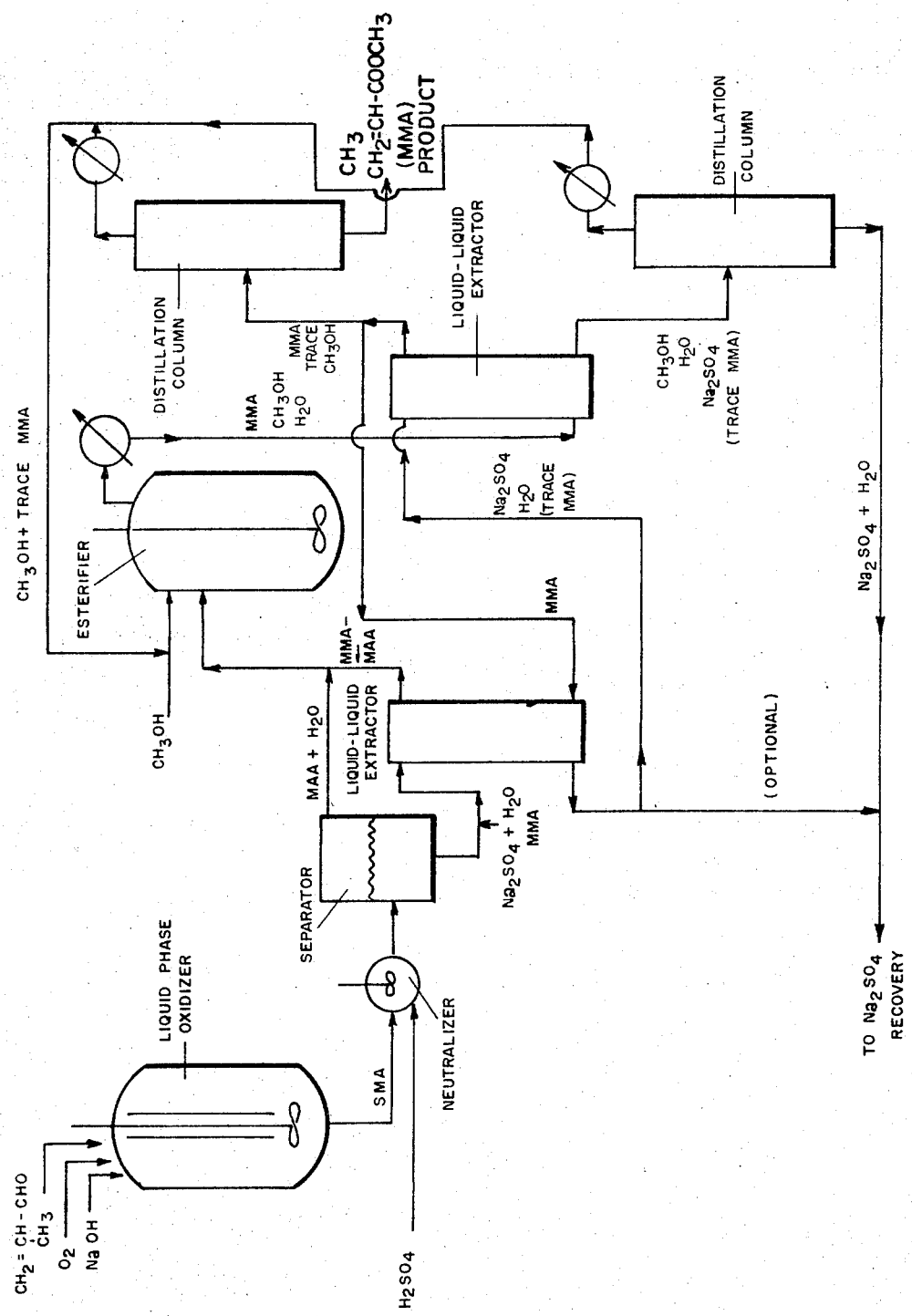

3,539,620
PROCESS FOR THE PRODUCTION OF METHYL METHACRYLATE
Donald M. Coyne, Prairie Village, Kans., and William C. Francis, Houston, Tex., assignors to Gulf Research & Development Company, Pittsburgh, Pa., a corporation of Delaware
Filed Sept. 22, 1966, Ser. No. 581,270
Int. Cl. C07c 69/54
U.S. Cl. 260—486                                  3 Claims

ABSTRACT OF THE DISCLOSURE

This invention relates to conversion of sodium methacrylate to methyl methacrylate. More particularly, this invention is an improved method for manufacturing methyl methacrylate in high purity from an aqueous solution of sodium methacrylate obtained by oxidation of methacrylaldehyde.

In the past it has been proposed to recover methacrylic acid from the neutralized product of oxidation of methacrylaldehyde by acidification, extraction with hydrocarbon solvents, and purification, prior to esterification. The crude esterification mixture has then been treated by distillation with a solvent to remove water and methanol from the ester. The separate purification processes for the acid and the ester, with the necessity of solvent removal and recovery have necessitated considerable expense, both in operation and for the large and complex purification apparatus. It has not been discovered that the recovery and purification of the acid, as well as the esterification and purification of the ester can be combined in such a way as to utilize only normal reaction products within the system in performing all of the steps, thus eliminating the introduction of additional solvents and reagents, which normally create purification problems.

Briefly, the process may be described as comprising the following steps:
(a) Reacting the aqueous sodium methacrylate with sulfuric acid to produce a mixture containing a methacrylic acid phase and aqueous sodium sulfate phase,
(b) Separating the methacrylic acid phase from the aqueous sodium sulfate phase,
(c) Extracting the aqueous sodium sulfate phase of step (b) with methyl methacrylate to recover an extract containing methyl methacrylate and methacrylic acid and an aqueous sodium sulfate raffinate,
(d) Combining the methacrylic acid phase from step (b) with the extract of step (c) and reacting the resulting mixture with methanol under esterification conditions to yield a methyl methacrylate product,
(e) Extracting the methyl methacrylate product of step (d) with the aqueous sodium sulfate raffinate of step (c) to yield a methyl methacrylate product phase of low water and methanol content and an aqueous extract phase containing sodium sulfate, methanol and a minor amount of methyl methacrylate,
(f) Distilling the methyl methacrylate product of step (e) to yield substantially pure methyl methacrylate and preferably also,
(g) Recovering methanol and methyl methacrylate from the aqueous extract phase of step (e) and recycling the recovered methanol and methyl methacrylate to step (d).

The aqueous sodium sulfate remaining after step (g) is a by-product which may be disposed of in a suitable manner. It is presently preferred to recover sodium sulfate from this aqueous mixture, or to employ the mixture in formulating detergent compositions for spray-drying. The entire process is preferably operated continuously.

Following is a brief description of the individual steps, with references to the drawing, so that the process will be readily understood by those possessing skill in the art. For the sake of convenience, methacrylic acid is designated as MAA and the methyl ester as MMA. Laboratory scale operations are described for illustrative purposes, so that the procedures may be readily repeated to gain familiarity with the individual steps of the process.

(a) Neutralization of sodium methacrylate

One liter (1,120 g.) of aqueous sodium methacrylate solution (referred to as SMA in the drawing; 26.43 wt. percent SMA, 2.74 moles) was neutralized with concentrated sulfuric acid (3.30 eq.) to pH 2. Two phases separated. In the normal operation of the process, this step is carried out in a stirred neutralizer as indicated in the drawing.

(b) Phase separation

The two phases produced above were separated by gravity and were analyzed by a combination of gas-liquid chromatography (GLC) and wet methods. Results were obtained as follows:

| Phase | Ml. | G. | GLC vol. percent MAA | Wet analysis, wt. percent | | | |
|---|---|---|---|---|---|---|---|
| | | | | MAA | $H_2O$ | $Na_2SO_4$ | Total |
| Organic | 253 | 256 | 82.5 | 82.4 | 15.8 | 0.14 | 98.3 |
| Aqueous | 840 | 990 | 2.20 | 1.98 | 75.8 | 18.4 | 96.2 |

Based on the GLC results, 98 percent of the MMA was recovered. Of the MAA, 92 percent was in the organic phase and 8 percent was in the aqueous phase. This step is normally performed in a gravity separator, as indicated in the drawing.

(c) Extraction of methacrylic acid from aqueous sodium sulfate with methyl methacrylate The aqueous phase from above (800 ml.) was extracted three times with 6 ml. of MMA. The extracts were combined and analyzed by GLC (34 ml.).

| | Vol. percent | Percent of total |
|---|---|---|
| Methacrylic acid | 45.2 | 85 |
| Methyl methacrylate | 47.0 | 89 |
| Water (Karl Fischer) | 7.6 | |
| Total | 99.8 | |

The efficiency of extraction of MAA from the aqueous phase with a small volume of MMA is surprising. This step is performed in a liquid-liquid extractor, as indicated in the drawing, very few extraction stages being required.

(d) Esterification of methacrylic acid with methanol

The correct proportion of the methacrylic acid phase from (1) above (220 ml.) was combined with 30 ml. of the above MMA extract and 186 ml. of methanol as feed for the esterification. The calculated feed composition and the moles fed during a 5.9 hour material balance were as follows:

| | Vol. percent | Moles fed |
|---|---|---|
| Methanol | 43.0 | 2.88 |
| Methacrylic acid | 45.2 | 1.44 |
| Methyl methacrylate | 3.3 | 0.08 |
| Water | 8.6 | 1.29 |
| Total | 100.1 | |

The experiment was begun with the equilibrium pot mixture remaining from a previous esterification, so that the results would be essentially identical to those obtained in continuous operation.

The total run time for the esterification was 9.5 hours. After 3.6 hours of operation, a 5.9 hour sample of the product was collected. The GLC analyses were as follows (vol. percent).

| Phase | Vol., ml. | MMA | MMA | Methanol | $H_2O$* | Total, percent |
|---|---|---|---|---|---|---|
| Organic (moles) | 214 | 66.5 (1.34) | 0.9 (0.023) | 24.5 (1.29) | 12.5 (1.49) | 104.4 |
| Aqueous (moles) | 32 | 18.4 (0.065) | 0.3 (0.001) | 37.8 (0.31) | 42.7 (0.80) | 99.2 |

*Karl Fischer analyses.

The following data summarize the balance around the esterification:

|  | Percent |
|---|---|
| Methacrylic acid conversion | 98.3 |
| Methyl methacrylate yield | 94 |
| Excess methanol recovered | 110 |
| Water yield | 86 |

Traces of sodium sulfate carried into the esterification reactor from the preceding extraction step, as well as certain organic impurities, accumulate and must be removed by periodic cleanout or by continuous purging.

(e) Extraction of methanol and water with aqueous $Na_2SO_4$

The above two-phase mixture (240 ml.) was extracted three times with 80 ml. of the aqueous $Na_2SO_4$ solution from (b) above. The aqueous extracts were combined and both the organic and aqueous phases were analyzed by GLC (vol. percent). Results were as follows:

| Phase | Ml. | Percent MMA | Percent MeOH | Percent $H_2O$* | Total |
|---|---|---|---|---|---|
| Organic | 146 | 95.0 | 2.7 | 2.3 | 100.0 |
| Aqueous | 329 | 1.31 | 17.0 | 17.8 |  |

*Karl Fischer analysis.

Based on the above analysis, the organic phase contained 96 percent of the MMA and 6 percent of the methanol. The aqueous phase contained 3 percent of the MMA and 90 percent of the methanol. This step is conducted in a liquid-liquid extractor, as indicated in the drawing.

(f) Distillation of methanol and water from methyl methacrylate

The methanol and water were topped from the above methyl methacrylate product (100 ml.) by fractional distillation as indicated in the drawing. The equipment used in the laboratory procedure consisted of a 1 in. x 18 in. vacuum jacketed distillation column equipped with a vapor dividing head and packed with ⅛ in. protruded stainless steel packing. The L/D ratio was controlled at 20/1. The azeotropes of methanol and MMA (B.P. 64° C., 85% methanol) and of $H_2O$ and MMA (B.P. 83° C., 14% $H_2O$) were taken overhead and eventually some MMA came over. The methyl methacrylate remaining in the pot analyzed 99.99 percent MMA with only traces of methanol present.

(g) Distillation of methanol and methyl methacrylate from aqueous sodium sulfate The above distillation equipment was utilized for distilling methanol and its MMA azeotrope from the aqueous sodium sulfate solution (200 ml.) in the laboratory. In normal operation of the process, a separate distillation column is used, as indicated in the drawing. The majority of the methanol was taken overhead at 63° at a L/D ratio of 5/1. Eventually some water was taken overhead. The pot residue (138 ml.) was analyzed by GLC and was shown to contain only traces of methanol and methyl methacrylate.

DISCUSSION

Among the advantages of the process described above are the following:

(1) No added solvents such as hexane are required, which would eventually contaminate products. The only reagents necessary in the process are sulfuric acid and methanol.

(2) Methacrylic acid is not subjected to high temperatures such as those required during solvent stripping, thus minimizing polymerization.

(3) Heating of methyl methacrylate during its isolation is minimized. Prior art methods have employed azeotropic distillation to remove solvents, which involved considerable heating, with consequent losses by polymerization.

It is the surprising efficiency of the two extractions which makes the process feasible, as well as the fact that the esterification is found to operate well continuously under very mild conditions. For these reasons it is feasible to operate without introduction of either solvents or catalysts, thus greatly alleviating purification problems. With the exception of the esterification and two distillations the process is normally operated at ambient temperature and atmospheric pressure.

What is claimed is:

1. A process for manufacturing methyl methacrylate from aqueous sodium methacrylate comprising the steps:
    (a) reacting aqueous sodium methacrylate with sulfuric acid to produce a mixture containing a methacrylic acid phase and an aqueous sodium sulfate phase,
    (b) separating the methacrylic acid phase from the aqueous sodium sulfate phase,
    (c) extracting the aqueous sodium sulfate phase produced in step (b) with methyl methacrylate to recover an extract containing methyl methacrylate and methacrylic acid and an aqueous sodium sulfate raffinate,
    (d) combining the methacrylic acid phase from step (b) with the extract produced in step (c) and reacting the resulting mixture with methanol under esterification conditions to yield a methyl methacrylate product,
    (e) extracting the methyl methacrylate product of step (d) with the aqueous sodium sulfate raffinate of step (c) to yield a methyl methacrylate product and an aqueous extract containing sodium sulfate, methanol and a minor amount of methyl methacrylate, and
    (f) distilling the methyl methacrylate product of step (e) to yield substantially pure methyl methacrylate.

2. A process for manufacturing methyl methacrylate from aqueous sodium methacrylate comprising the steps:
    (a) reacting aqueous sodium methacrylate with sulfuric acid to produce a mixture containing a methacrylate acid phase and an aqueous sodium sulfate phase,
    (b) separating the methacrylic acid phase from the aqueous sodium sulfate phase,
    (c) extracting the aqueous sodium sulfate phase produced in step (b) with methyl methacrylate to recover an extract containing methyl methacrylate and methacrylic acid and an aqueous sodium sulfate raffinate,
    (d) combining the methacrylic acid phase from step (b) with the extract produced in step (c) and reacting the resulting mixture with methanol under esterification conditions to yield a methyl methacrylate product,
    (e) extracting the methyl methacrylate product of step (d) with the aqueous sodium sulfate raffinate of step (c) to yield a methyl methacrylate product and an aqueous extract containing sodium sulfate, methanol and a minor amount of methyl methacrylate, (f) distilling the methyl methacrylate product of step (e) to yield substantially pure methyl methacrylate, and (g) recovering methanol and methyl methacrylate from the aqueous extract of step (e) and recycling the recovered methanol and methyl methacrylate to step (d) leaving an aqueous sodium sulfate solution as a by-product.

3. A process for manufacturing methyl methacrylate from aqueous sodium methacrylate comprising the steps:

(a) reacting aqueous sodium methacrylate with sulfuric acid to produce a mixture containing a methacrylic acid phase and an aqueous sodium sulfate phase, (b) separating the methacrylic acid phase from the aqueous sodium sulfate phase, (c) extracting the aqueous sodium sulfate phase produced in step (b) with methyl methacrylate to recover an extract containing methyl methacrylate and methacrylic acid and an aqueous sodium sulfate raffinate, (d) combining the methacrylic acid phase from step (b) with the extract produced in step (c) and reacting the resulting mixture with methanol under esterification conditions to yield a methyl methacrylate product, (e) extracting the methyl methacrylate product of step (d) with the aqueous sodium sulfate raffinate of step (c) to yield a methyl methacrylate product and an aqueous extract containing sodium sulfate, methanol and a minor amount of methyl methacrylate, (f) distilling the methyl methacrylate product of step (e) to yield substantially pure methyl methacrylate, (g) recovering methanol and methyl methacrylate from the aqueous extract of step (e) and recycling the recovered methanol and methyl methacrylate to step (d) leaving an aqueous sodium sulfate solution as a by-product, and (h) recovering a sodium sulfate product from the aqueous sodium sulfate solution of step (g).

References Cited

UNITED STATES PATENTS

| 2,744,928 | 5/1956 | Smith et al. | 260—486 XR |
| 2,987,542 | 6/1961 | Modiano | 260—486 |

FOREIGN PATENTS 539,289    4/1957    Canada.

LORRAINE A. WEINBERGER, Primary Examiner

A. P. HALLUIN, Assistant Examiner